United States Patent
Grinstead et al.

(10) Patent No.: US 12,351,014 B2
(45) Date of Patent: Jul. 8, 2025

(54) OPTIMIZED AC POWERED AUXILIARY UNITS FOR MEDIUM/HEAVY DUTY CONFIGURABLE ELECTRIC TRUCKS

(71) Applicant: Zeus Electric Chassis, Inc., White Bear Lake, MN (US)

(72) Inventors: Robert L. Grinstead, Chisago City, MN (US); William Brandt, White Bear Lake, MN (US)

(73) Assignee: Zeus Electric Chassis, Inc., White Bear Lake, MN (US)

( * ) Notice: Subject to any disclaimer, the term of this patent is extended or adjusted under 35 U.S.C. 154(b) by 133 days.

(21) Appl. No.: 17/881,395

(22) Filed: Aug. 4, 2022

(65) Prior Publication Data
US 2023/0202280 A1    Jun. 29, 2023

Related U.S. Application Data

(60) Provisional application No. 63/230,004, filed on Aug. 5, 2021.

(51) Int. Cl.
*B60K 1/04* (2019.01)
*B60L 1/00* (2006.01)
(Continued)

(52) U.S. Cl.
CPC ............ *B60K 1/04* (2013.01); *B60L 1/003* (2013.01); *B60L 50/51* (2019.02); *B60L 50/66* (2019.02);
(Continued)

(58) Field of Classification Search
CPC .... B60K 1/04; B60K 2001/006; B60K 25/00; B60L 1/003; B60L 50/51; B60L 50/66;
(Continued)

(56) References Cited

U.S. PATENT DOCUMENTS

| 6,227,322 B1 | 5/2001 | Nishikawa |
| 7,520,354 B2 | 4/2009 | Morrow et al. |

(Continued)

FOREIGN PATENT DOCUMENTS

| CN | 205903548 U | 6/2017 |
| WO | WO 2021108429 A1 | 6/2021 |

OTHER PUBLICATIONS

"Electric truck manufacturer Zeus Electric Chassis closes on seed round", retrieved at https://www.bizjournals.com/twincities/inno/stories/fundings/2021/04/19/zeus-electriic-truck-manufacturer-white-bear-lake.html on Aug. 5, 2021, dated Apr. 19, 2021, 5 pages.

(Continued)

*Primary Examiner* — Jason D Shanske
*Assistant Examiner* — James J Triggs
(74) *Attorney, Agent, or Firm* — Barnes & Thornburg LLP

(57) ABSTRACT

A zero-emission configurable medium/heavy duty class electric truck is disclosed that uses high-voltage, battery-powered electrical energy for both motive power and auxiliary powered unit power. In embodiments, the electric truck includes a central frame having a pair of main frame rails configured to support at least two battery modules, a front subframe configured to support a front axle assembly and a cab, and a rear subframe configured to support at least one rear axle assembly and a rear payload module selected from one of the set of multiple configurable rear payload modules. In embodiments, at least one of the front axle assembly and the rear axle assembly include an electric motive motor powered by a battery management system configured to manage generation and distribution of alternating-current (AC) electrical power from the at least two battery modules to the at least one electric motive motor to provide motive power to the zero-emission configurable (Continued)

electric truck and to at least one auxiliary power unit (APU) to provide auxiliary power to the rear payload module.

20 Claims, 14 Drawing Sheets

(51) Int. Cl.
    *B60L 50/51*     (2019.01)
    *B60L 50/60*     (2019.01)
    *H02B 1/20*     (2006.01)
    *A62C 31/00*     (2006.01)
    *B60K 1/00*     (2006.01)
    *B60K 25/00*     (2006.01)
    *B62D 33/077*     (2006.01)

(52) U.S. Cl.
    CPC ............... *H02B 1/20* (2013.01); *A62C 31/00* (2013.01); *B60K 2001/006* (2013.01); *B60K 25/00* (2013.01); *B60L 2200/36* (2013.01); *B60L 2210/40* (2013.01); *B62D 33/077* (2013.01)

(58) Field of Classification Search
    CPC ... B60L 2200/36; B60L 2210/40; H02B 1/20; A62C 31/00; B62D 33/077
    See application file for complete search history.

(56) References Cited

U.S. PATENT DOCUMENTS

| | | | |
|---|---|---|---|
| 8,739,907 B2 | 6/2014 | Storc et al. | |
| 9,731,605 B2 | 8/2017 | Wang et al. | |
| 9,809,182 B2 | 11/2017 | Brunbauer | |
| 10,046,614 B2 | 8/2018 | Borde et al. | |
| 10,112,470 B2 | 10/2018 | Hamilton et al. | |
| 10,131,381 B2 | 11/2018 | Ashraf et al. | |
| 10,493,837 B1 | 12/2019 | Angelo et al. | |
| 10,493,871 B2 | 12/2019 | Tone | |
| 10,899,387 B2 | 1/2021 | Milton et al. | |
| 10,919,575 B1 | 2/2021 | Sardes et al. | |
| 10,981,024 B1 | 4/2021 | Shively et al. | |
| 2012/0152631 A1* | 6/2012 | Oriet | B60W 10/02 477/6 |
| 2019/0225071 A1 | 7/2019 | Klucsarits et al. | |
| 2019/0351750 A1 | 7/2019 | Gassmann et al. | |
| 2020/0231212 A1 | 7/2020 | Kim | |
| 2020/0331536 A1 | 10/2020 | Sloan et al. | |
| 2020/0369140 A1 | 11/2020 | McCarron et al. | |
| 2021/0024131 A1 | 1/2021 | Baccouche et al. | |
| 2021/0046978 A1 | 2/2021 | Forostovsky et al. | |
| 2021/0107361 A1 | 4/2021 | Linsmeier et al. | |
| 2021/0107483 A1 | 4/2021 | Shively et al. | |

OTHER PUBLICATIONS

"Electrify Your Fleet," retrieved at https://zeuselectricchassis.com/ on Aug. 5, 2021, dated May 12, 2021, 12 pages.
"Fleet Electrification with SMUD", retrieved at https://californiamobilitycenter.org/e-spotlight-smud/ on Aug. 5, 2021, dated Jul. 24, 2021, 6 pages.
"SMUD Accelerates Its Fleet Electrification with Five All-Electric Work Trucks from Zeus Electric Chassis, Inc.", dated Feb. 1, 2021, 2 pages.
"Wayne Kugel CEO of Zeus Electric Truck Testified before MN House Committees", dated Feb. 18, 2021, 2 pages.
"Zeus Electric Chassis Becomes Newest Commercial Client at California Mobility Center", dated Mar. 24, 2021, 2 pages.
"Zeus Electric Chassis, Inc. Exceeds Private Seed Round Target", dated Apr. 9, 2021, 2 pages.
"Zeus Electric Utility Truck Chassis Unveiled", retrieved at https://www.truckutilities.com/zeus-electricutility-truck-chassis-unveiled/ on Aug. 5, 2021, dated Mar. 8, 2021, 4 pages.
"Zeus Truck", retrieved at https://startrackstrucks.com/wpcontent/uploads/Zeus-Trucks-5-Page-Flyer-72dpi.pdf on Aug. 5, 2021, dated May 12, 2021, 6 pages.
Guerry, Matthew, "Minnesota Environmental Regulators Tout Electrification Benefits at Visit to Zeus Electric Chassis", retrieved at https://zeuselectricchassis.com/minnesota-environmental-regulators-tout-electrification-benefits-at-visit-to-zeus-electric-chassis/ on Aug. 5, 2021, dated Jun. 18, 2021, 15 pages.
International Search Report and Written Opinion in PCT/US2022/039639, dated Oct. 28, 2022, 10 pages.
"Jossi, Frank, ""Minnesota startup sees a growing niche market for electric work trucks"", retrieved at https ://energynews. us/2021/02/08/minnesotastartup-sees-a-growing-niche-market-f orelectric-work-tmcks/ on Aug. 5, 2021, dated Feb. 8, 2021, 5 pages".
MacDonald, Mathew, "Zeus Electric Chassis capitalizes on growing electric work truck market", retrieved at https ://www.servicetruckmagazine.com/news/zeus-electric-chassis-capitalizes-on-growingelectric-work-t/ on Aug. 5, 2021, dated Feb. 17, 2021, 4 pages.
Nott Company, "EV Systems Leader Nott Company and Zeus Electric Chassis Enter Joint Development Agreement to Lead the Evolution of Vocational Vehicle Electrification", retrieved at https://zeuselectricchassis.com/market-leader-nott-company-to-partner-with-zeus-electric-chassis-inc/ on Aug. 5, 2021, dated Jul. 15, 2021, 14 pages.
Oxendine, Chez, "Choctaw Defense Manufacturing branches out with Zeus Electric Chassis partnership", Tribal Business News, retrieved at https://tribalbusinessnews.com/sections/economic-development/ 13532-choctaw-defense-manufacturing-branches-out-with-zeus-electricchassis-partnership on Aug. 5, 2021, dated Jun. 21, 2021, 14 pages.
Pierce® Volterra™ Platform of Electric Vehicles, accessed at https://www.piercemfg.com/electric-fire-trucks/pierce-volterra on Mar. 8, 2024, 17 pgs.
Rosenbauer RT™ firetrucks, accessed at https://www.everythingforthatmoment.com/en/new-products/rt-revolutionary-technology/ on Mar. 8, 2024, 6 pgs.
"Wood, Drew, ""Zeus Electric Chassis and the All-Electric Work Truck"", Minneapolis St. Paul Magazine, retrieved at https://mspmag.com/arts-and-culture/zeus-electric-chassis/ on Aug. 5, 2021, dated Apr. 29, 2021, 4 pages".
Zeus Electric Chassis Facebook Page, retrieved at https://www.facebook.com/zeuselectricchassis/ on Aug. 5, 2021, dated Aug. 4, 2021, 17 pages.
Zeus Electric Chassis, "Experience the Uncompromising Zeus All-Electric Work Truck Chassis at FDIC This August", retrieved at https://zeuselectricchassis.com/see-the-zeus-all-electric-work-truck-chassis-at-fdic-this-august/ on Aug. 5, 2021, dated Jul. 14, 2021, 14 pages.
Zeus Electric Chassis, "Zeus Announces SMUD as First Customer for Configurable, All Electric Work Trucks", retrieved at https://zeuselectricchassis.com/zeus-announces-smud-as-first-customer-for-configurable-all-electric-work-trucks/ on Aug. 5, 2021, dated May 12, 2021, 14 pages.
Zeus Electric Chassis, "Zeus Electric Truck Chassis", retrieved at https://web.archive.org/web/20200814081155/https://startrackstrucks.com/zeus-electric-chassis/ on Aug. 5, 2021, dated Aug. 14, 2020, 12 pages.
Zeus Electric Chassis, Inc., "Photo Gallery from Fleet Day, Jul. 2021", retrieved at https://zeuselectricchassis.com/photo-gallery-from-fleet-day-july-2021/ on Aug. 5, 2021, dated Jul. 22, 2021, 14 pages.
Zeus Electric Chassis, Inc., "Zeus Electric Chassis, Inc. to Provide Chassis for Pegasus Bus Company", retrieved at https://zeuselectricchassis.com/zeus-electric-chassis-inc-to-provide-chassis-for-pegasus-electric-buses/ on Aug. 5, 2021, dated Jul. 21, 2021, 15 pages.
Zeus Electric Chassis, video, retrieved at https ://link.edgepilot.com/s/68bf42ff/-89KaCe5fUCsy6f7i94J2A?u ==https://vimeo.com/494235950 on Aug. 5, 2021, dated Dec. 23, 2020, 18 pages.

* cited by examiner

OPTIMIZED AC POWERED AUXILIARY UNITS FOR MEDIUM/HEAVY DUTY CONFIGURABLE ELECTRIC TRUCKS

RELATED APPLICATION

This application claims the benefit of U.S. Provisional Application No. 63/230,004 filed Aug. 5, 2021, which is hereby fully incorporated herein by reference.

TECHNICAL FIELD

The present disclosure relates to supplying electrical power to auxiliary equipment of vehicles. More particularly, the present disclosure relates to systems that provide optimized alternating current (AC) power to motor powered auxiliary units for medium/heavy duty zero-emission configurable electric trucks.

BACKGROUND

Electric vehicles powered by battery systems, rather than combustion engines, are gaining popularity due to improved battery life and performance. Most of the advances in electric vehicles, however, have been with respect to electric passenger vehicles. For electric trucks, improvements have focused primarily on converting traditional combustion engine trucks into hybrid or all-electric versions. While there has been a range of advancements with respect to the electric motors and batteries, improvements to the auxiliary power/powered units (APUs) such as water and hydraulic pumps used for firetrucks, for example, have focused mainly on hybrid powered medium/heavy duty electric trucks in which an on-board combustion engine can power alternators or generators to furnish the electrical energy for such APUs that typically have larger power requirements. Examples of such hybrid electric firetrucks include the Pierce® Volterra™ firetrucks (see, https://www.piercemfg.com/electric-firetrucks/pierce-volterra and U.S. Pat. Nos. 7,520,354 and 10,981,024 and U.S. Publ. Appl. No. 2021/010736 A1), and the Rosenbauer RT™ firetrucks (see https://www.everythingforthatmoment.com/en/new-products/rt-revolutionary-technology/and U.S. Pat. No. 9,809,182 and U.S. Publ. Appl. No. 2019/022507 A1).

Various improvements to the electrical power distribution systems for vehicles are described, for example, in U.S. Pat. Nos. 9,731,605 and 10,046,614. However, there is still a need for improved designs that can provide optimized power to motor powered auxiliary powered units for medium/heavy duty zero-emission configurable electric trucks, and to the design and operation of such motor powered auxiliary powered units that are specific to zero-emission configurable electric trucks that use battery-powered electrical energy for both motive power and auxiliary powered unit power.

SUMMARY

A system and method for providing optimized alternating current (AC) power to motor powered auxiliary powered units (APUs) is disclosed for medium/heavy duty zero-emission configurable electric trucks that use high-voltage, battery-powered electrical energy for both motive power and auxiliary powered unit power. In various embodiments, the APUs may be high-powered pump units, such as a high-pressure water pump suitable for use in fighting fires or a high-performance hydraulic pumps for use in providing motive hydraulic power for moveable rear payload units equipped on the configurable electric truck.

In various embodiments, instead of using direct-current (DC) to power the APUs, alternating-current (AC) power is provided by an inverter that is specifically optimized for the peak-continuous power demands of a corresponding permanent-magnet motor that provides power to the APU. In some embodiments, multiple APUs are configured to be carried by the configurable electric truck and each APU is provided with its own AC inverter to allow for optimization of each APU independent of any other APU power or motive power requirements for the electric truck. In some embodiments, the AC electric motor for an APU is designed to have windings at peak power to match the optimized power supplied by the AC inverter to optimizes the speed and torque for the pump at the most efficient electrical power requirement. In some embodiments, the AC electric motor may be liquid cooled to improve a desired power density. In various embodiments, the AC electric motor(s) for an APU can range from 25-175 HP and can include optional gear box or gearing configuration to optimize the RPM interface between the AC electric motors and the functional motor for the APU, such as a pump motor.

In various embodiments, a chassis frame for the zero-emission electric truck includes a central frame having a pair of main frame rails configured to support at least two battery modules substantially within an intra-frame space defined between the pair of main frame rails. A front subframe is configured to support a cab and a front axle unit, and a rear subframe is configured to support at least one rear axle unit and any of a set of multiple configurable rear payload units via a common connection interface. Both the front subframe and the rear subframe are operably connected to the main frame rails. In some embodiments, each axle unit has a single electric motor powered by a battery management system. In various embodiments, each motor is mounted forward of the corresponding axle unit. In other embodiments, only a rear axle unit has an electric motor and a front axle unit does not. In various embodiments, the battery management system manages the distribution of electrical power from the at least two battery modules to the electric motors for propulsion as well as to any auxiliary power used, for example, by a rear payload module. In various embodiments, the zero-emission electric truck to be customized for the wide range of existing applications for class 3-8 medium/heavy duty trucks without the need for multiple chassis styles and sizes which can improve vehicle lifespan by simplifying servicing, reconfiguration and repairs that occur more often for medium/heavy duty trucks than passenger vehicles due to the nature of heavy use on these classes of trucks.

In embodiments, one of the APUs may be a high-pressure water pump suitable for use in fighting fires that is optimized for being powered by an AC invertor in accordance with various embodiments. In various embodiments, the water pump is sized to be powered as an APU and is carried as part of a rear payload unit of a configurable electric truck. In various embodiments, the high-pressure water pump can provide flow rates up to 2000 gallons-per-minute (GPM) at pressures up to 250 PSI.

In some embodiments, separate AC inverters are connected to a common high voltage DC bus and then to an AC inverter to provide AC power for motive power and also to one or more AC inverters to provide AC power to corresponding APUs. In embodiments, the high voltage DC bus is a 400-800V bus connected to the battery management system, the AC inverter(s) that provide motive power to the motors on the axle unit(s) can provide up to 100 KW, and the AC inverter(s) that provide auxiliary power to the APU(s) can each provide between 15 kW-300 kW.

In various embodiments, the AC electric motors are selected from a family of customized motors available form Parks and the water pump motors are selected from a family of customized motors available from IDEX, for example. In some embodiments, the electric motor powered by the AC inverter and the mechanical motor that powers the APU are mated with a shaft interface such as a male/female spline instead of a bell coupler.

In various embodiments, unlike conventional mechanical power take-off (PTO) drives for APU, the flexibility of using AC power the APUs allows the APUs to be located anywhere on the chassis and/or rear payload unit as there is no need to for the APU to be mechanically inline with a PTO.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
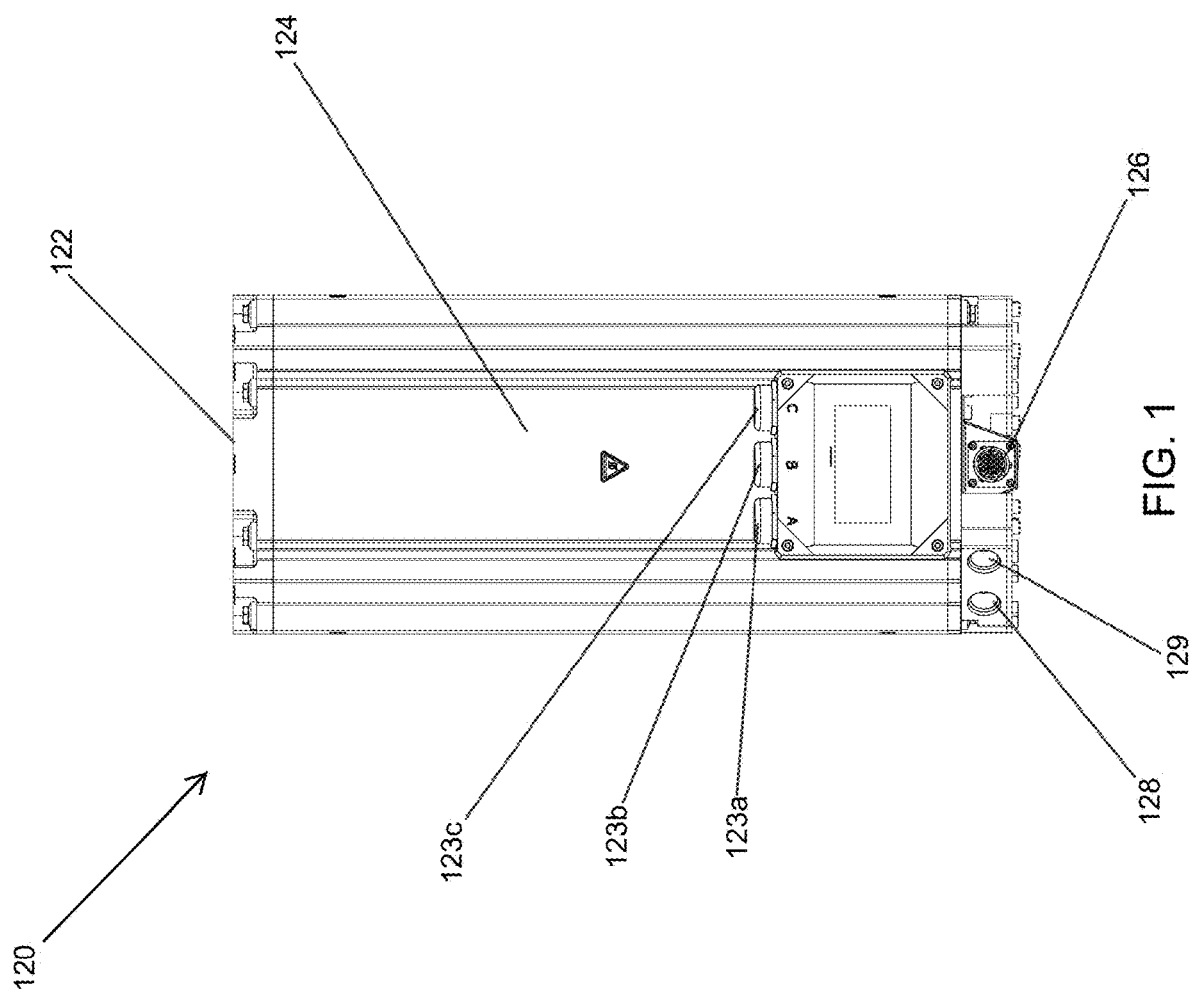
FIG. 1 is a top view of a water pump AC motor.
Figure 2:
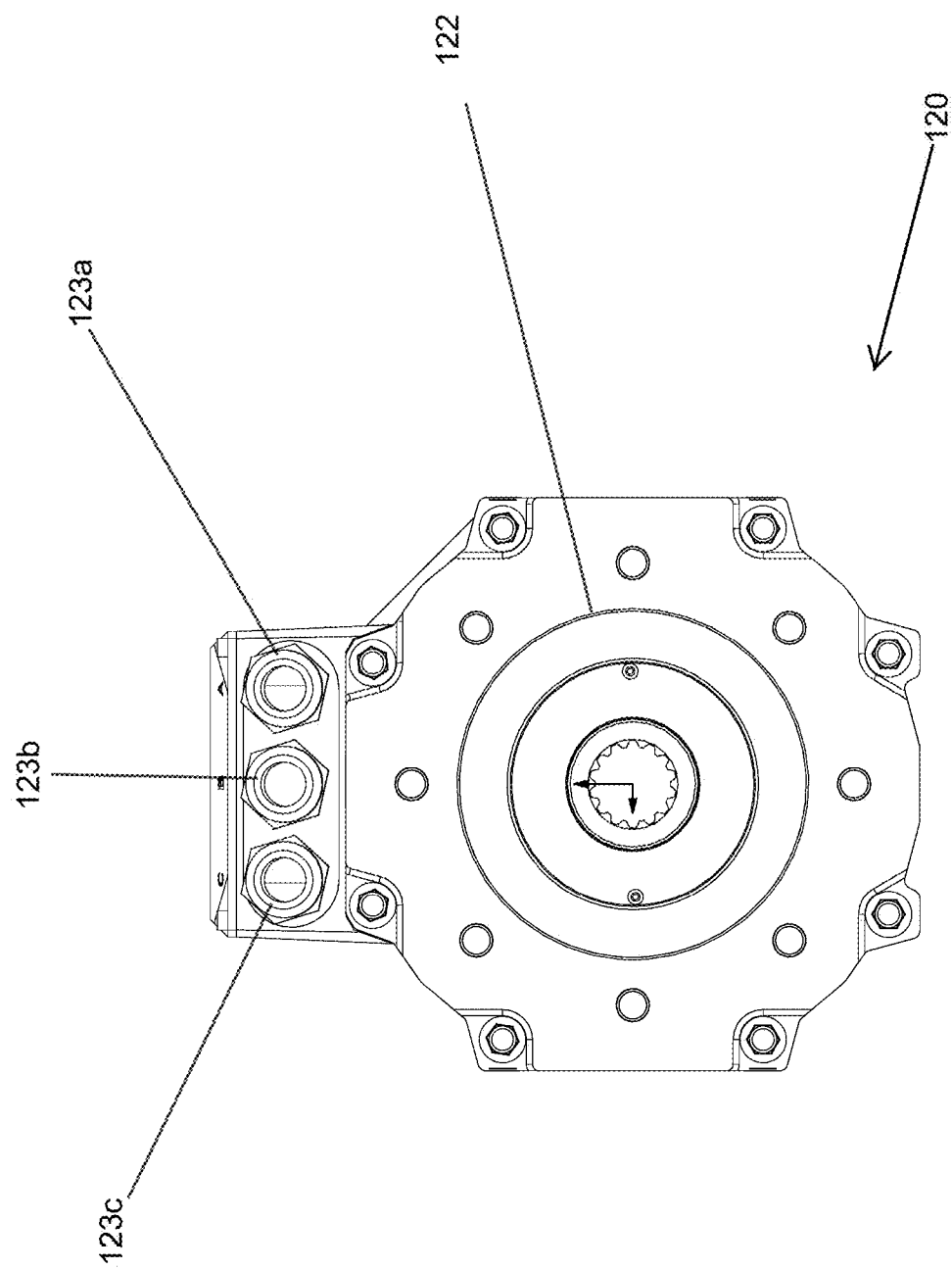
FIG. 2 is an end view of the water pump AC motor of FIG. 1.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

As used herein, terms of direction or spatial orientation shall be generally understood according to their ordinary and customary meanings. By way of partial examples, "longitudinal" refers to a lengthwise direction or primary direction of travel of the vehicle, e.g., in the forward or rearward directions as commonly understood; "lateral" or cross refers to a direction generally transverse to longitudinal; "fore" or forward refers to the front of the vehicle with respect to the primary direction of travel; "aft" or rearward refers to the rear of the vehicle with respect to the primary direction of travel; "left" is in relation to facing forward; "right" is in relation to facing forward; "down" or below refers to the direction of the ground or surface on which the vehicle is intended to be operated; and "up" or above refers to a direction generally opposite of down.

Referring now to FIGS. 1, 2, 6, and 7, a motor assembly 120 generally defined by an alternating current (AC) motor shaft 124 with a face defining a motor-pump interface 122, at least one electrical input connector(s) 123, a data input/output (I/O) connector 126, and a coolant inlet 128 and a coolant outlet 129 are shown.

Figure 3:
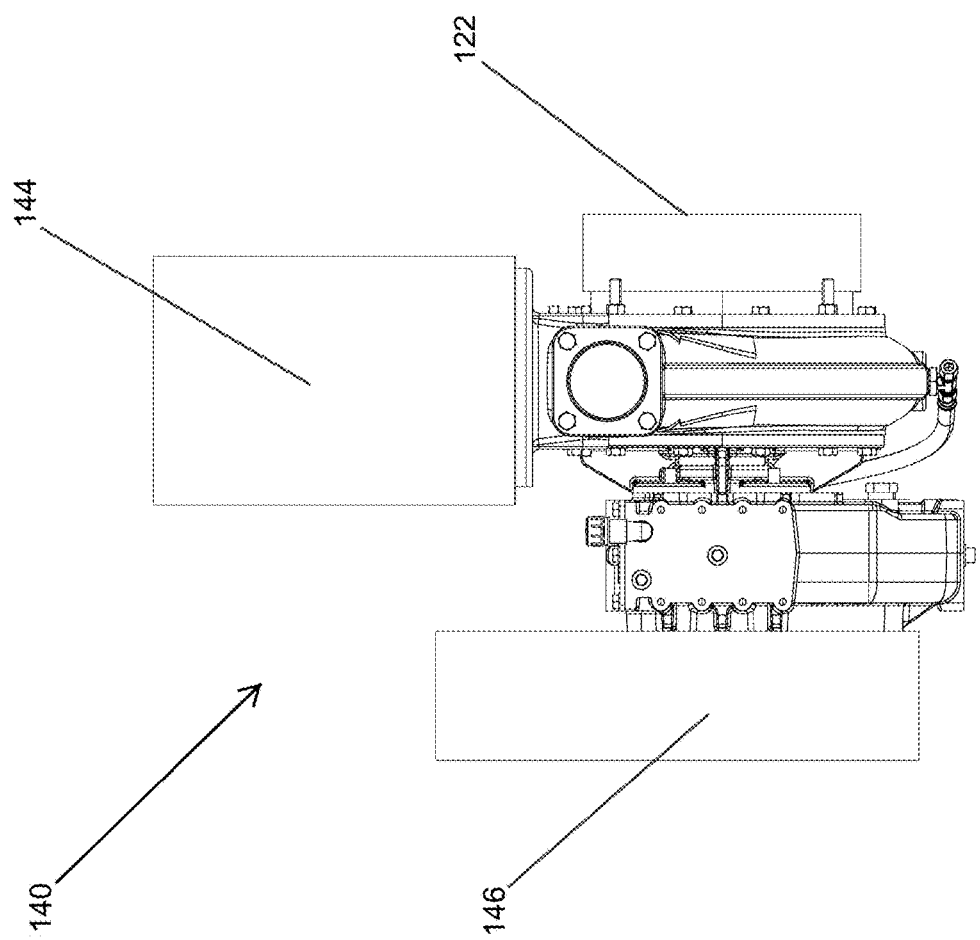
FIG. 3 is an end view of a water pump.
Figure 4:
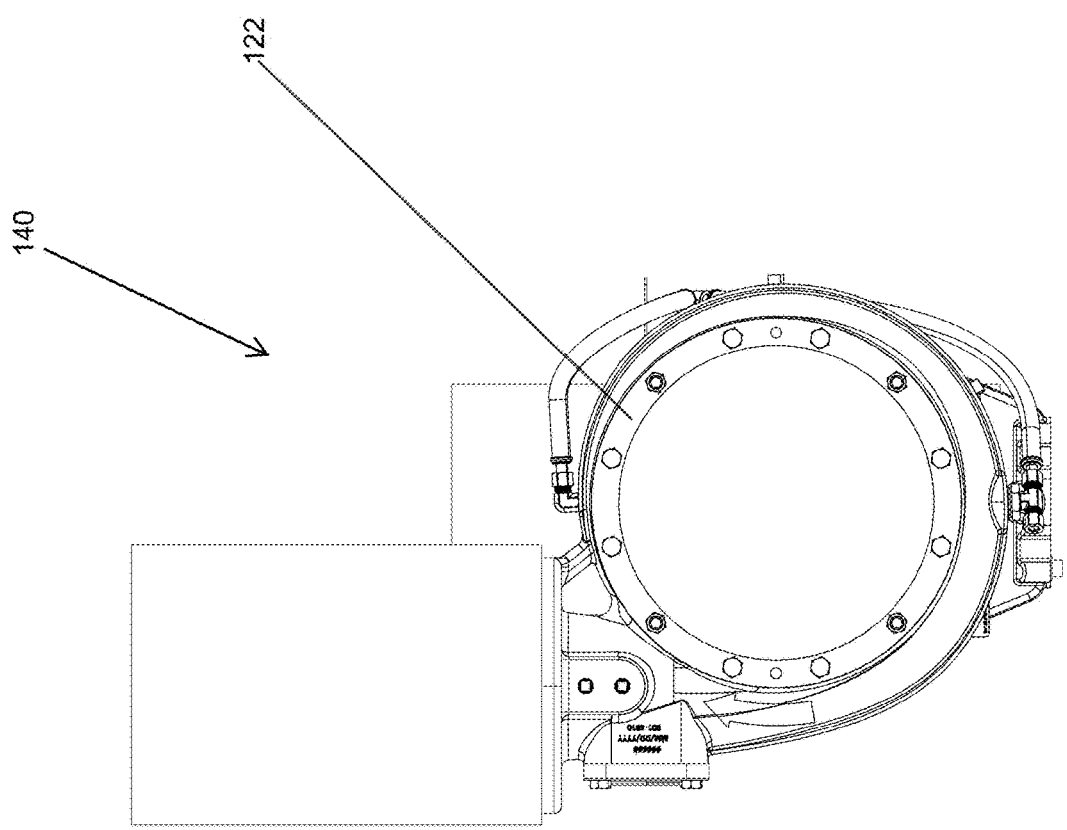
FIG. 4 is an end view of a second end of the water pump of FIG. 3.
Figure 5:
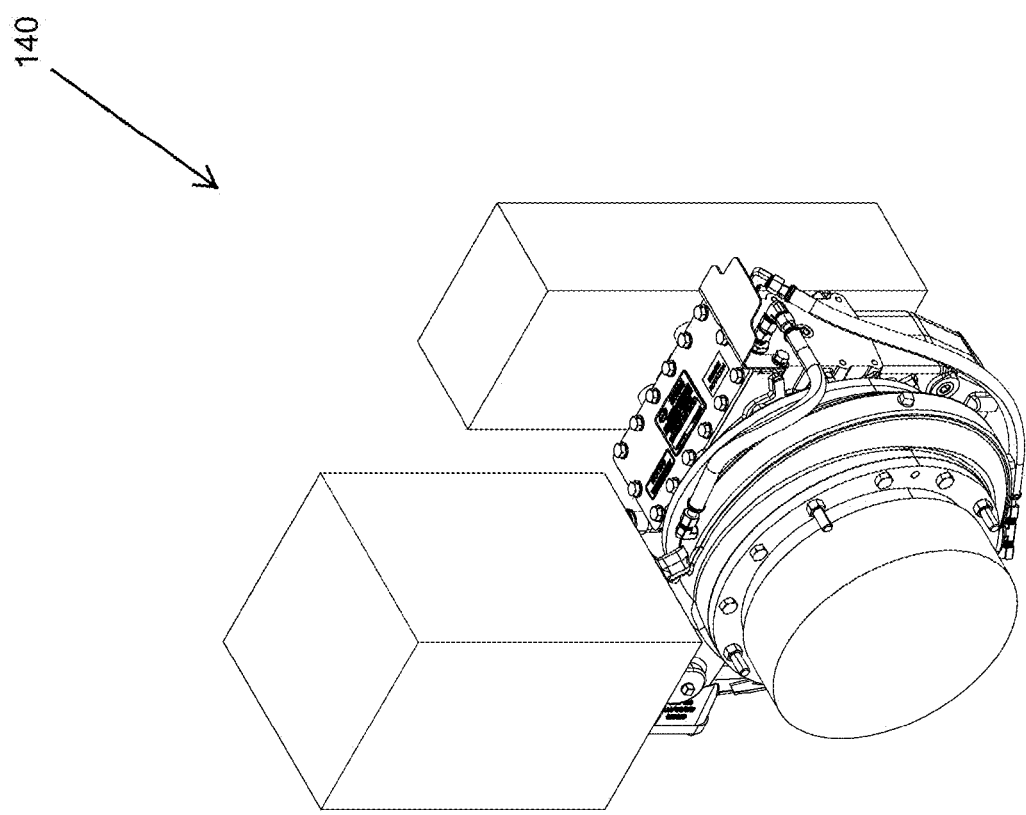
FIG. 5 is a perspective view of the water pump of FIG. 3.
Figure 6:
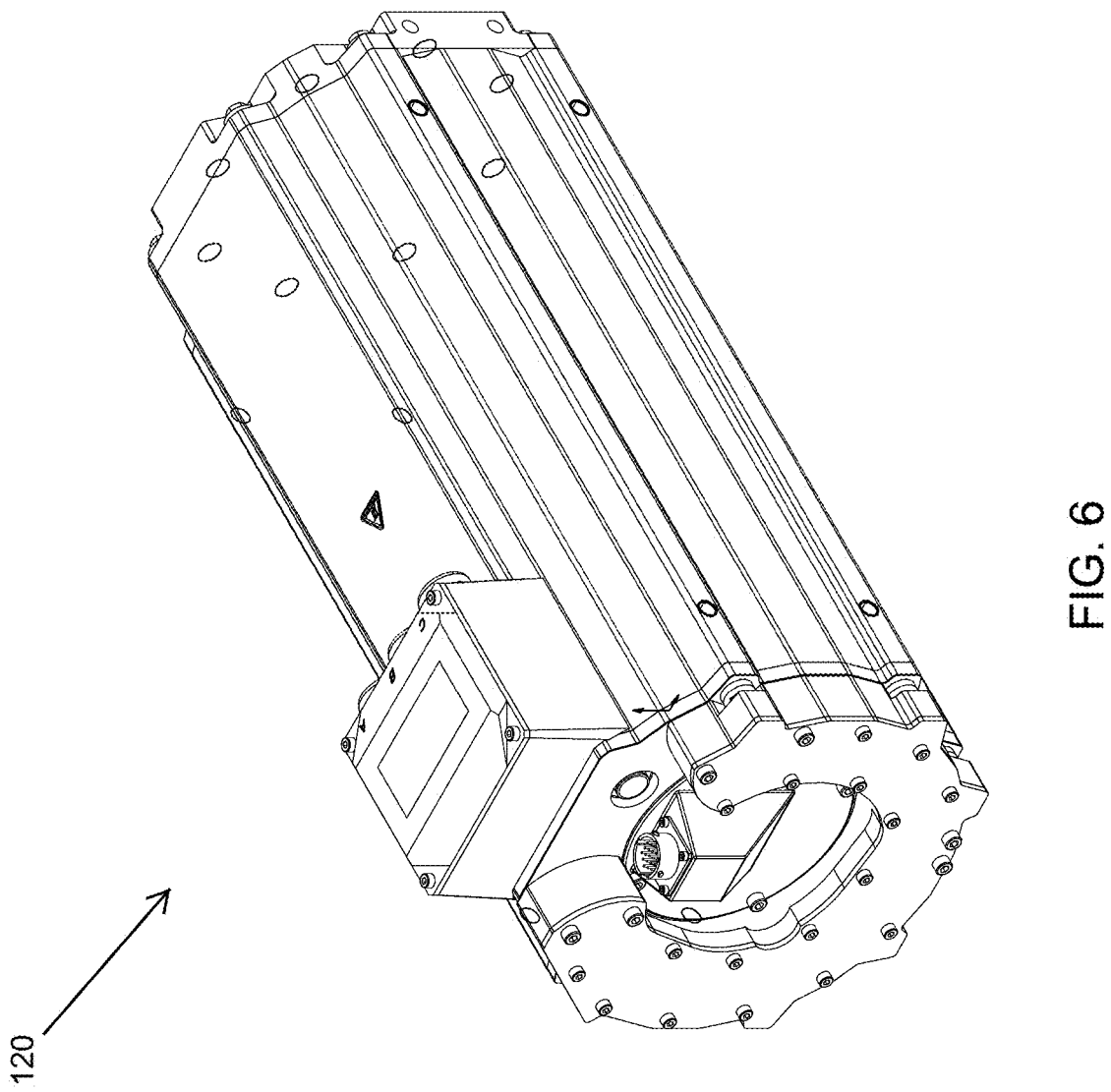
FIG. 6 is a perspective view of the water pump AC motor of FIG. 1.
Figure 7:
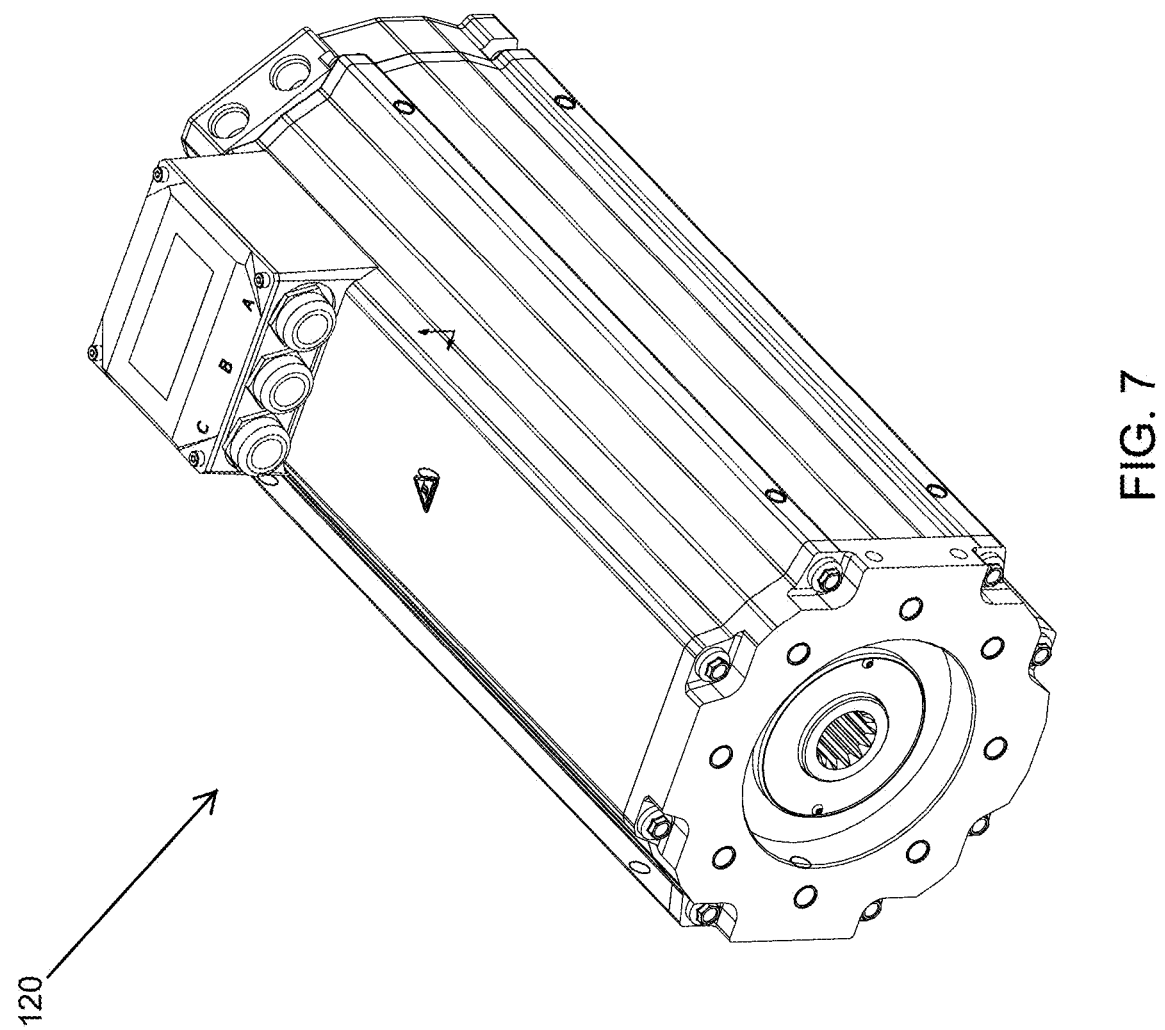
FIG. 7 is a perspective view of another end of the water pump AC motor of FIG. 6.

FIGS. 3-5 show a water pump 140 comprised of a water inlet 144 and water outlet 146, with a face defining a motor-pump interface 122. The motor-pump interface is generally configured in a male/female spline rather than a typical bell coupler.

Figure 8:
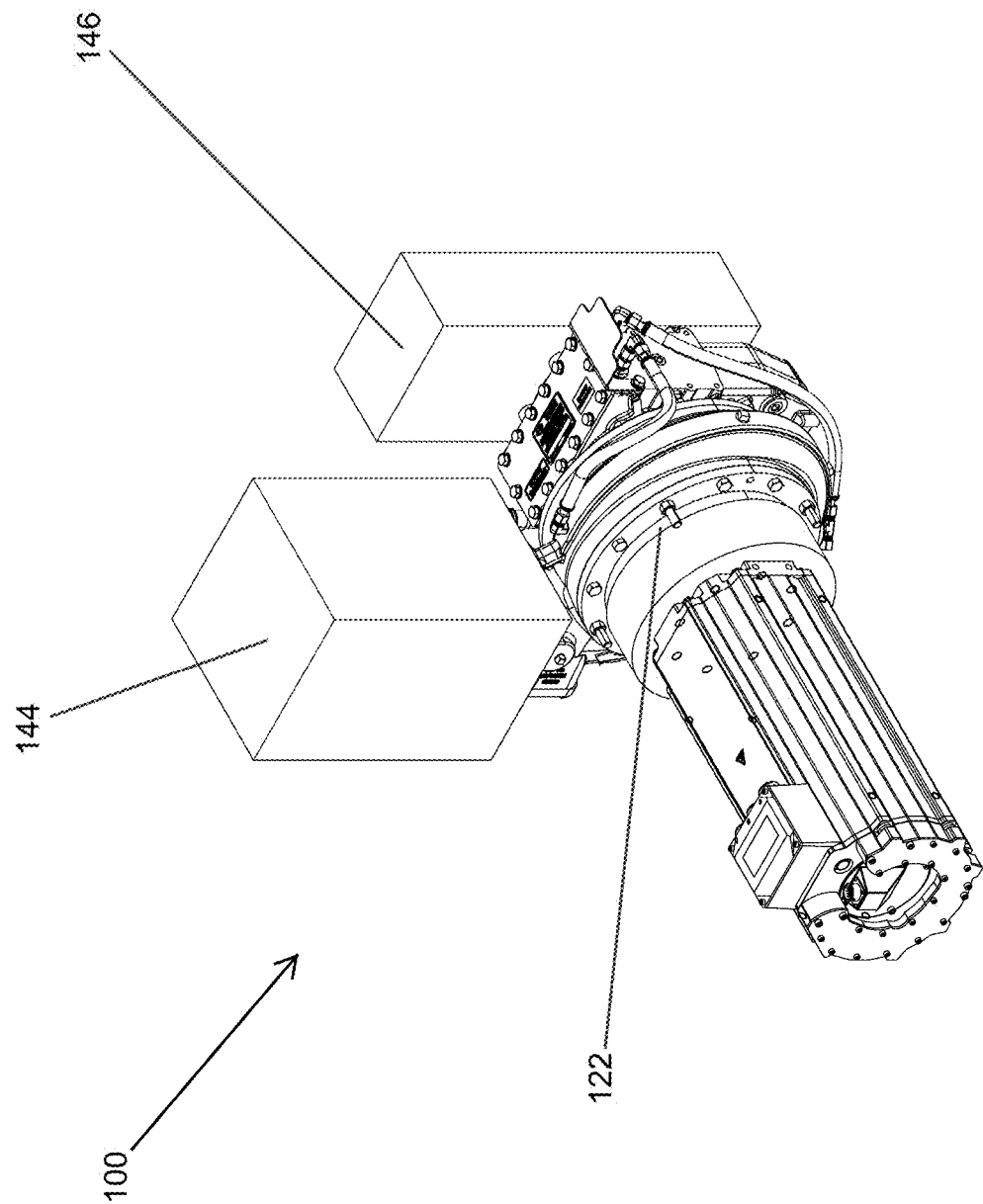
FIG. 8 is a perspective view of a motor-pump assembly.
Figure 9:
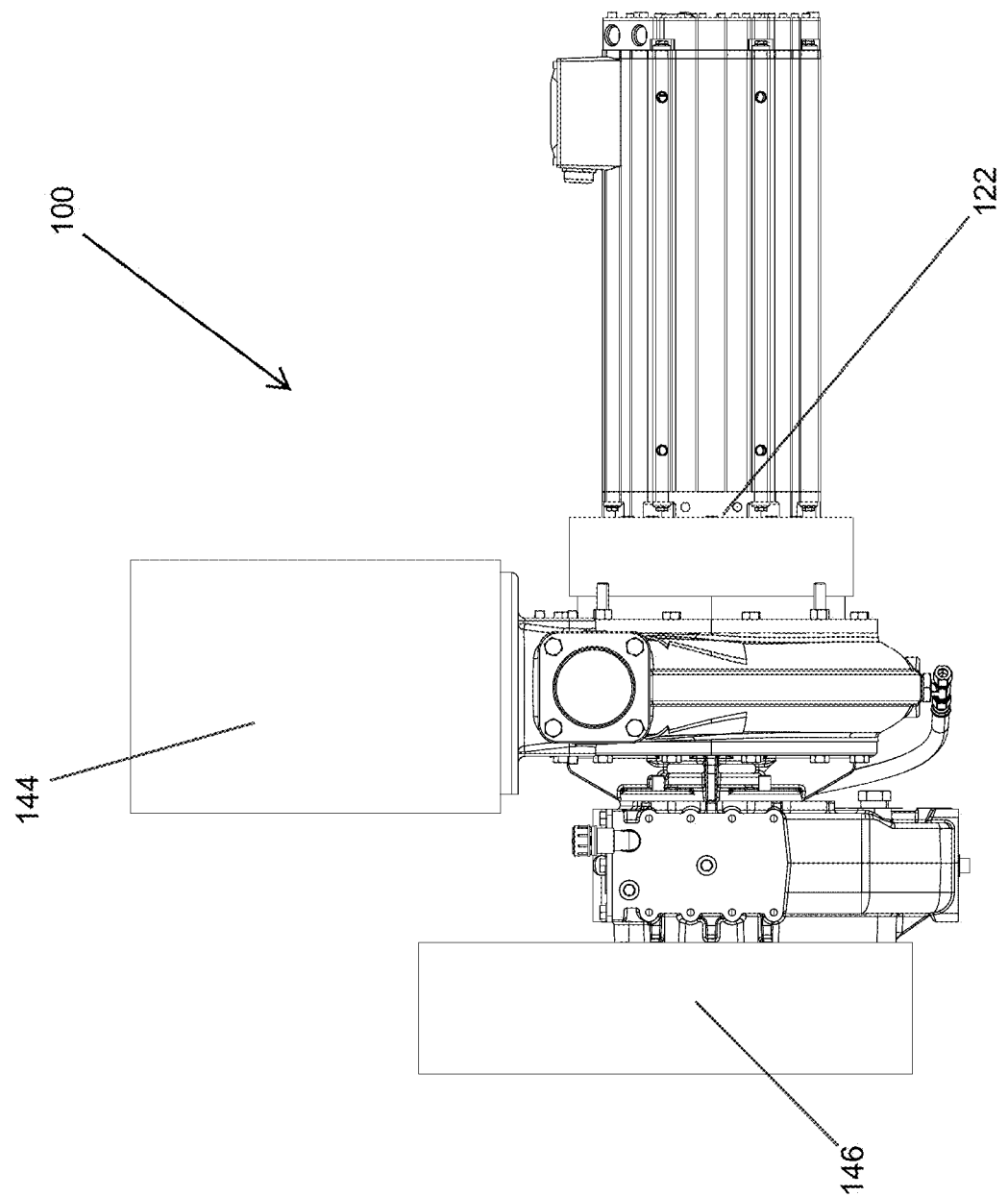
FIG. 9 is a side view of the motor-pump assembly of FIG. 8.
Figure 10:
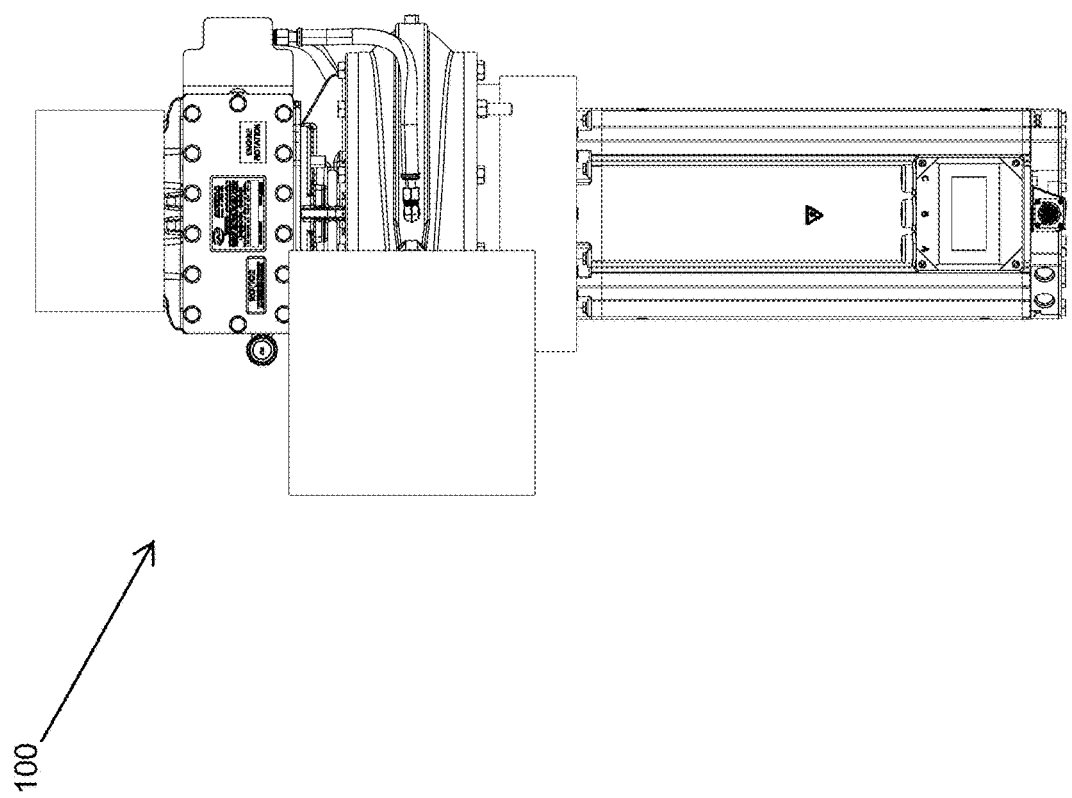
FIG. 10 is a top view of the motor-pump assembly of FIG. 8.

Turning now to FIGS. 8-10, an embodiment is demonstrated wherein the motor-pump interface 122 is in a mated configuration defining a motor-pump assembly 100.

Figure 11:
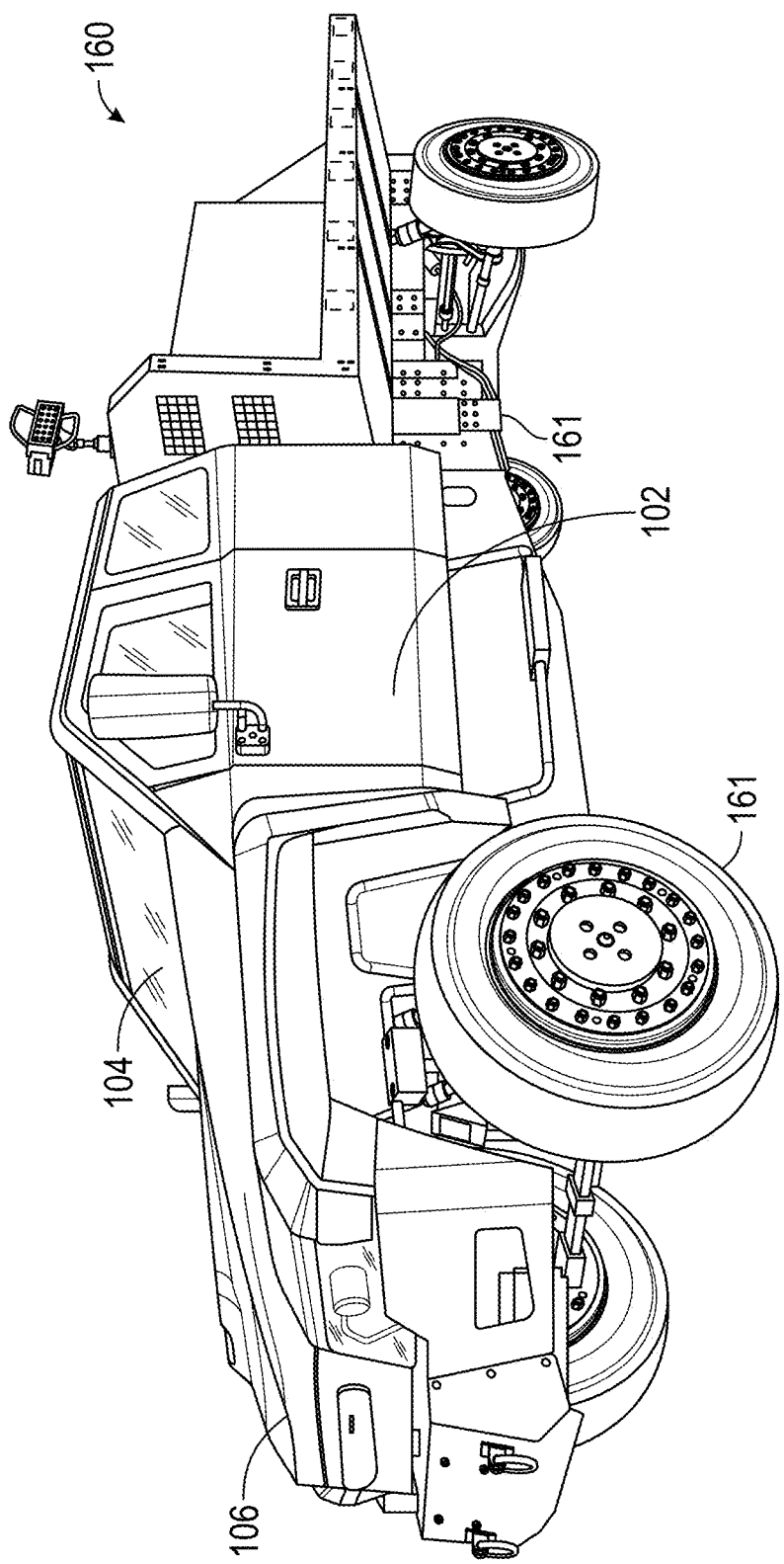
FIGS. 11, 12, and 13 are perspective, back, and rear perspective views of an electric truck that carries an auxiliary powered unit (APU) in the form of a high pressure water pump suitable for firefighting, according to an embodiment.
Figure 12:
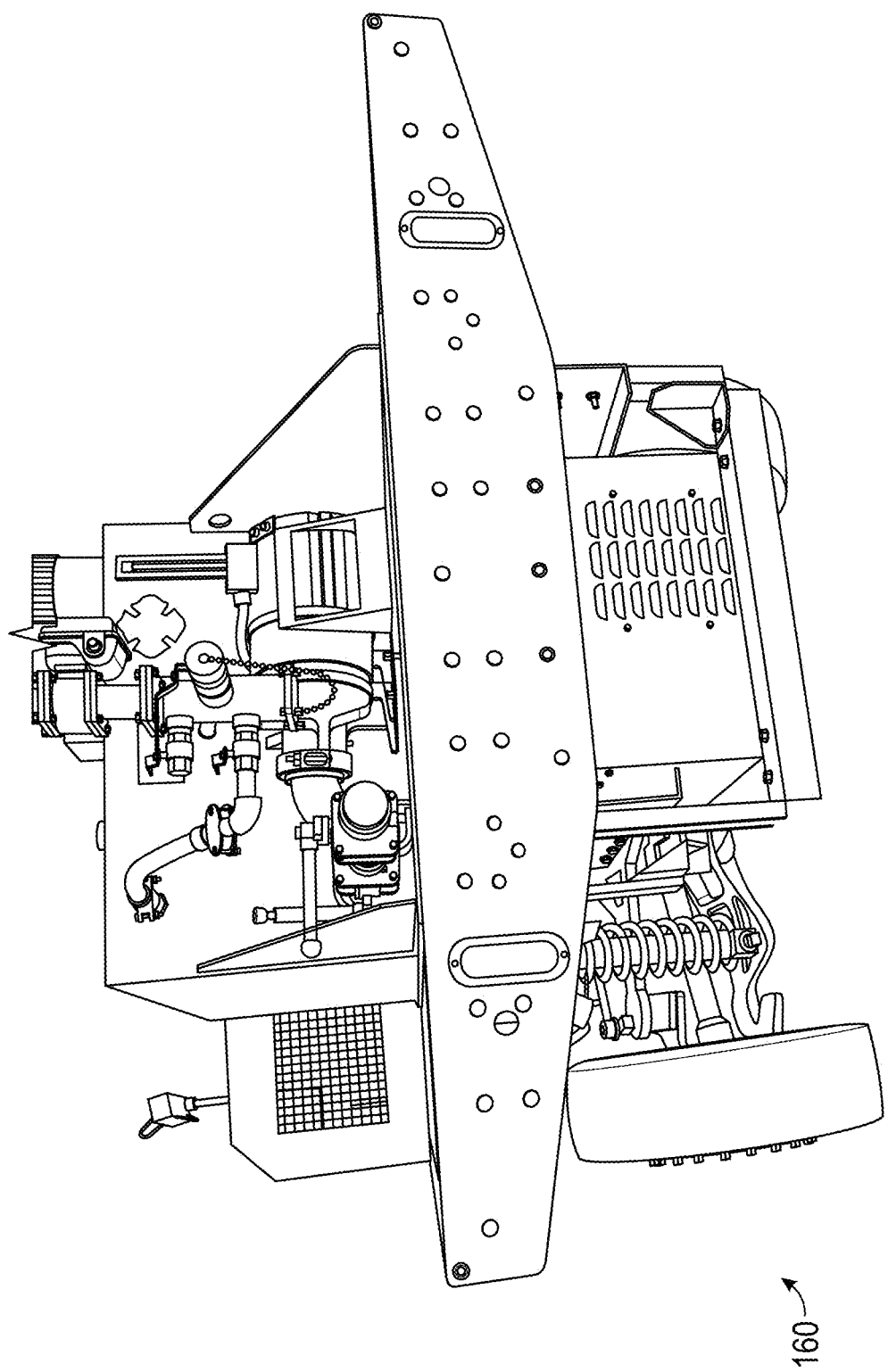
Figure 13:
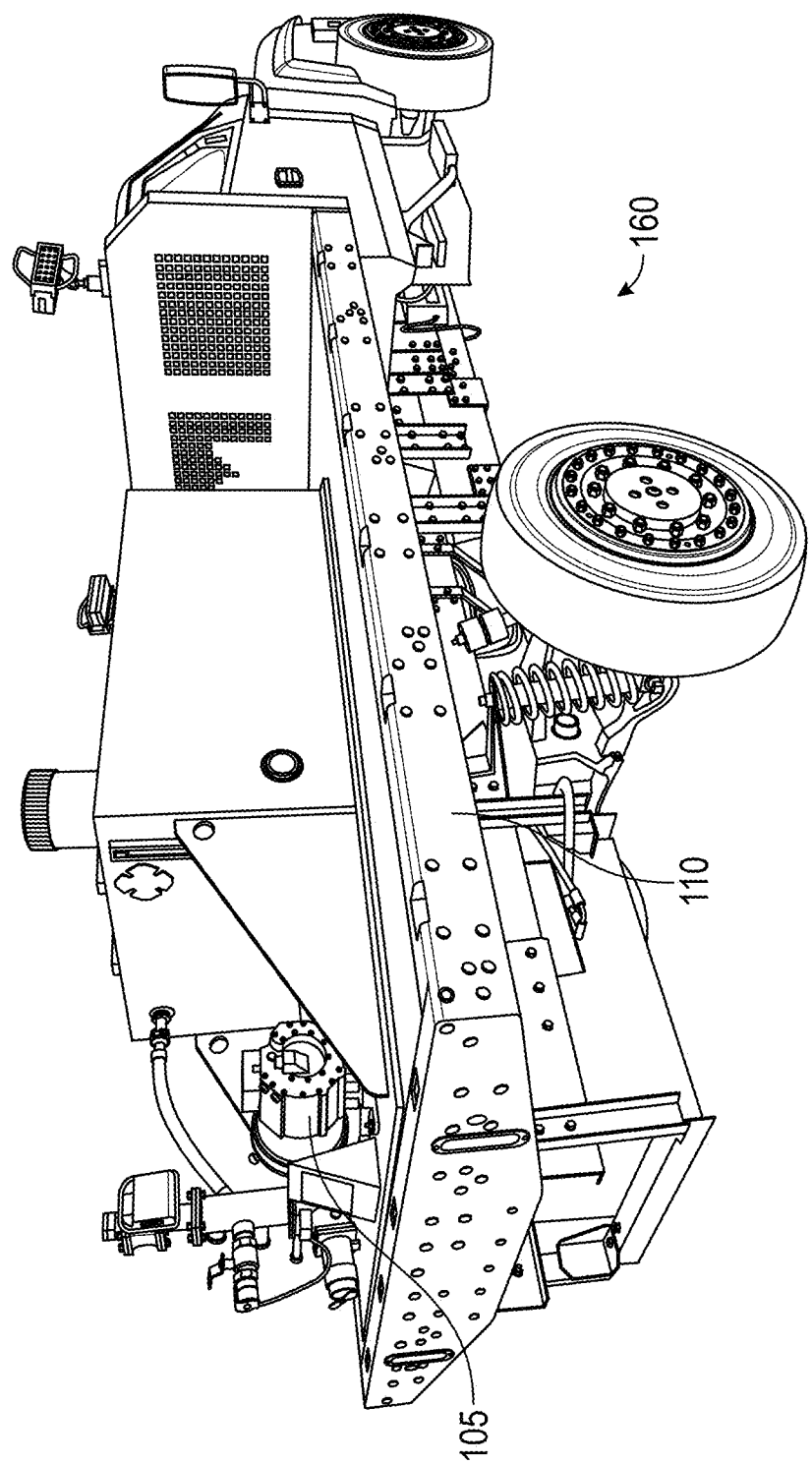

Referring now to FIGS. 11-13, an electric truck vehicle 160 is depicted, including a cab 102 coupled to a chassis 161. In an embodiment, vehicle 160 may be configured as a "cab chassis" or "chassis cab" vehicle as depicted, for supply to an upfitting specialist for final configuring as one of many types of vehicles or truck with configurable rear portions such as: service truck, flatbed, box truck, dump truck, garbage truck, street cleaner, roll off truck, bus, mini-bus, recreational vehicle, and the like. In another embodiment, vehicle 160 may be configured fully assembled with a configurable rear portion already provided and attached for delivery to an end customer. An APU 105 as will be described is shown mounted on a flatbed rear payload module 110 of vehicle 160.

In various embodiments, medium/heavy-duty electric trucks have a common electric truck chassis-frame approach that provides a common design platform for such vehicles is configurable to meet the mission needs of vocations such as municipalities, utilities, construction, refuse and emergency vehicles. In some embodiments, upfitting kits may be provided for various embodiments of a rear payload module carried by the rear portion 110 of the chassis 161, such as telescopic aerial buckets, cherry pickers, specialty food service, heavy-duty service units, ambulance, rescue, and snow removal. In other embodiments, the electric trucks may include integration of a myriad of aftermarket tools such as welders, hydraulics, air compressors, generators, or the like, in either or both the rear portion 110 or the cab portion 102 of the vehicle 160.

In various embodiments, cab 102 may include a passenger compartment 104 that may be configured in a variety of manners as desired. As depicted in FIG. 11, passenger compartment 104 may be configured as a two-door extended cab. Optionally, one or more rearward-opening doors may be included for ease of access to space behind the driver and front passenger seats. Passenger compartment 104 may include one or more storage spaces or cubbies therein. In other embodiments, passenger compartment 104 may be configured as a four-door crew cab.

In embodiments, cab 102 may include a frontal compartment 106, defined by a hood, fenders, front grill and firewall. Frontal compartment 106 may include a battery management system, a thermal management system for one or more of electric motors or batteries, and/or HVAC components for cab 102.

In various embodiments, the range of payloads and GVWR for a commercial electric truck utilizing the common chassis frame as disclosed generally can be up to a maximum of the combination of the axle ratings minus the weights of the chassis frame, battery units, cab and auxiliary features. In one embodiment in which the front axle rating is 7,300 pounds and rear axle rating is 16,000 pounds for a total gross vehicle weight rating of 22,300 lbs.

In various embodiments the weight of the chassis frame and the battery units are each in the range of 1,500-3,000 lbs, depending upon configuration (e.g. front-wheel drive vs. all-wheel drive) and the total number of battery packs (e.g., 2-4+), which combined with a range of 500-4,000 lbs for the weight of the cab, passengers, and auxiliary units generate a payload range for these embodiments up to 16,000 lbs. In various embodiments, the total payload capacity can be allocated between rear module payload weight and cargo payload weights according to the specific type of rear payload module for which the vehicle is configured.

In some embodiments, vehicle 160 is configured with electric motors to drive each axle assembly. Vehicle 100 may also be configured to selectively operate only one electric motor depending on driving conditions, for example during steady-state operation. In some embodiments, vehicle 160 may have a single (front) electric motor 166a configured as a front-wheel drive electric truck suitable for a GVWR above 10,000 lbs (4,500 kg). Providing power to electric motor(s) 166 may be two or more batteries or battery packs 162.

In various embodiments, vehicle 160 includes three battery packs 162, although greater or fewer batteries are also contemplated. Suitable battery types include lithium-ion, lithium iron phosphate (LiFePOx), or other types such as hydrogen (fuel cell), LiCo, LiNiCoAl, and LiTi. In embodiments, suitable total battery capacity for vehicle 160 may be 105 kWh or more, 150 kWh or more, 200 kWh or more, 250 kWh or more, 400 kWh or more.

Embodiments described herein may be suitable for vehicles of gross vehicle weight ratings (GVWR) above 10,000 pounds, generally known as Class 3-Class 8 vehicles in the United States. In various embodiments, the range of dimensions from the back of the cab to the rear axle can be between 60"-200". In various embodiments, the range of dimensions from the rear axle to the back of the rear frame can be between 30"-80". In various embodiments, these dimensional ranges are sufficient to accommodate a wide variety of rear modules for Class 3-8 trucks on the common frame chassis embodiments as disclosed.

Figure 14:
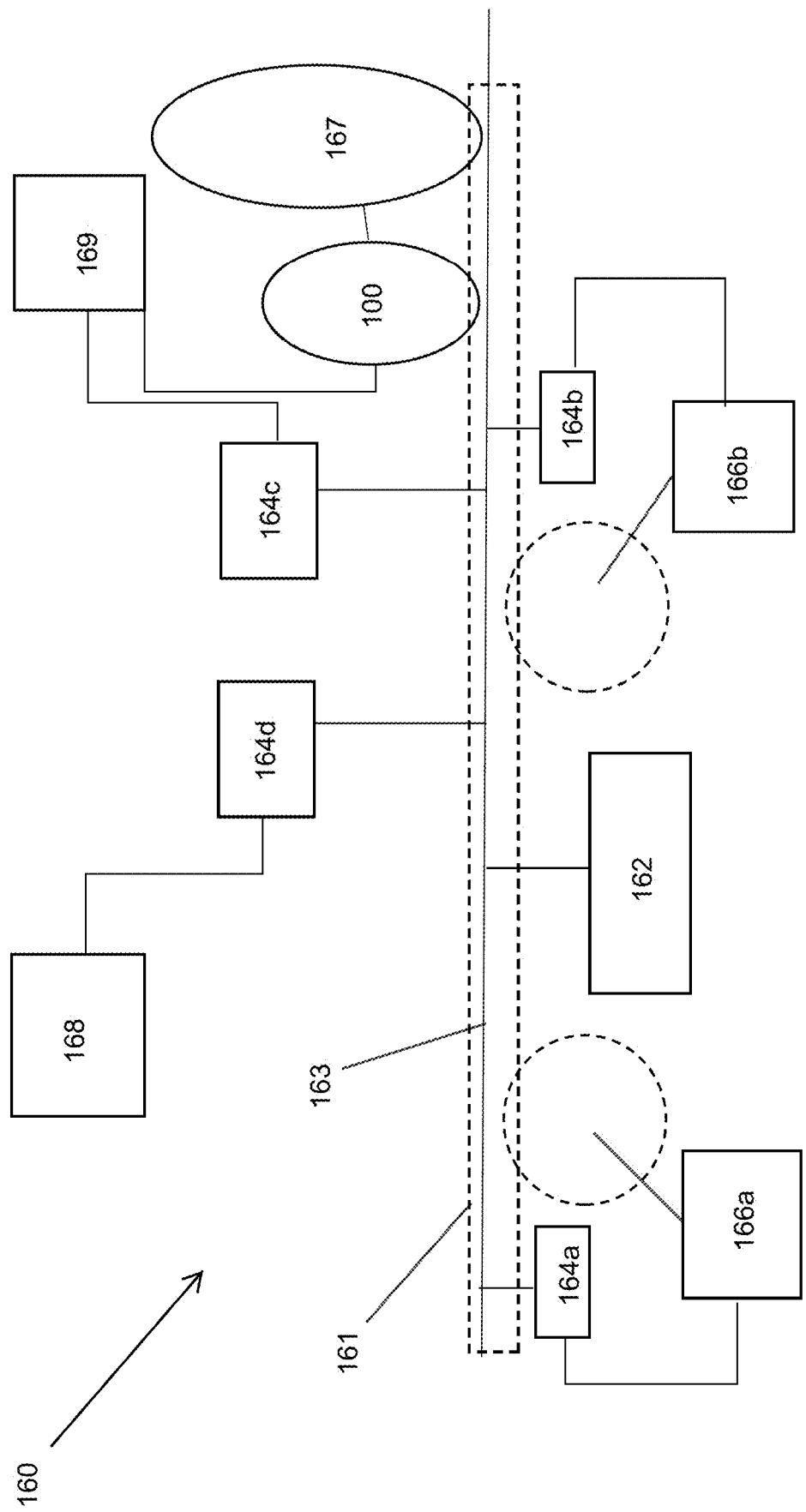
FIG. 14 is a schematic diagram of the electric truck of FIG. 11.

Referring now to FIG. 14, a schematic diagram is shown demonstrating the relationships of various electrical and mechanical portions of the vehicle 160. At least one battery pack 162 is mounted to a chassis 161 (shown in dashed lines) with a direct current (DC) bus 163 granting power from the battery pack 162 to various DC to AC inverters 164a-d. DC to AC inverter 164a provides power to front axle motive motor 166a and is tuned to provide a specific power output to the motive motor 166a such that the motive motor 166a runs at a peak current for a desired torque. Similarly, DC to AC inverter 164b provides power to rear axle motive motor 166b and is tuned to provide a specific power output to the motive motor 166b such that the motive motor 166b runs at a peak current for a desired torque. However, DC to AC inverter 164c provides power to a water pump APU 169 which generally comprises a motor pump assembly 100 and water tank 167 in this embodiment, and DC to AC inverter 164c is tuned to a potentially different peak current output according to the needs of the motor pump assembly 100. Likewise, DC to AC inverter 164d provides power to a second APU 168 which is customized to the vocation of the truck. The second APU 168, for example, could be a computer system for a fire truck, a dump for a refuse truck, or any other APU.

Submitted with as Appendix A to the provisional application that is incorporated by reference herein are certain materials that were made publicly available by, for, or from the inventors and assignees hereof not more than one-year prior to the effective filing date hereof and are therefore subject to the exceptions to prior art as set forth in 35 U.S.C. § 102(b)(1)(A).

Submitted with as Appendix B to the provisional application that is incorporated by reference herein are certain redacted confidential materials with respect to offers for sale made by, for, or from the inventors and assignees hereof not more than one-year prior to the effective filing date hereof and are therefore subject to the exceptions to prior art as set forth in 35 U.S.C. § 102(b)(1)(A).

Submitted with as Appendix C to the provisional application that is incorporated by reference herein is a copy of a previously filed provisional application, Application Ser. No. 63/190,474, entitled "Universal Chassis Frame for Medium-Duty Configurable Electric Trucks," filed on May 19, 2021 by the assignee of the present disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A zero-emission configurable electric truck that uses high-voltage, battery-powered electrical energy for both motive power and auxiliary powered unit power, the zero-emission configurable electric truck being a medium/heavy duty class of truck having a chassis frame configured to interface with any of a set of multiple configurable rear payload modules and a gross vehicle weight rating above 10,000 lbs, the zero-emission configurable electric truck comprising:

a central frame having a pair of main frame rails configured to support at least two battery modules;

a front subframe configured to support a front axle assembly and a cab, the front subframe including a pair of upper frame members operably connected to the corresponding pair of the main frame rails; and a rear subframe configured to support at least one rear axle assembly and a rear payload module selected from one of the set of multiple configurable rear payload modules, the rear subframe including a pair of rear frame rails transversely connected by at least a pair of cross members and operably connected to the corresponding pair of main frame rails, wherein at least one of the front axle assembly and the rear axle assembly includes at least one electric motive motor powered by a battery management system configured to manage generation and distribution of alternating-current (AC) electrical power from the at least two battery modules to the at least one electric motive motor to provide motive power to the zero-emission configurable electric truck and to at least one auxiliary power unit (APU) to provide auxiliary power to the rear payload module, wherein the at least one APU includes multiple APUs in which each APU is configured to be carried by the zero-emission configurable electric truck and each APU is provided with its own DC-to-AC inverter to allow each APU to be optimized independent of any other APU power or motive power requirements.

2. The zero-emission configurable electric truck of claim 1, wherein the chassis frame includes a high voltage, direct current (DC) bus providing power from a battery pack via the battery management system to a plurality of DC-to-AC inverters, including at least one DC-to-AC inverter that is configured to provide AC electrical power to the at least one electric motive motor at a specific power output such that the motive motor runs at a first peak current for a desired torque of the at least one electric motive motor, and at least one at least one DC-to-AC inverter that is configured to provide AC electrical power to the at least one APU at a specific power output such that the at least one APU runs at a second peak current different than the first peak current.

3. The zero-emission configurable electric truck of claim 1, wherein the at least one APU is selected from the set consisting of a high-pressure water pump suitable for use in fighting fires or a high-performance hydraulic pumps suitable for use in providing motive hydraulic power to the rear payload module.

4. The zero-emission configurable electric truck of claim 1, wherein the at least one APU includes an AC electric motor with windings designed that produce a peak power to match an optimized power supplied by the DC-to-AC inverter to optimize a speed and torque for the AC electric motor for an electrical power requirement for a payload powered by the at least one APU.

5. The zero-emission configurable electric truck of claim 4, wherein the at least one AC electric motor is liquid cooled to improve a desired power density.

6. The zero-emission configurable electric truck of claim 4, wherein the at least one AC electric motor ranges from 25-175 HP.

7. The zero-emission configurable electric truck of claim 4, wherein the at least one AC electric motor further includes a gearing configuration to optimize an RPM interface between the at least one AC electric motors and a functional motor for the at least one APU.

8. The zero-emission configurable electric truck of claim 1, wherein one of the at least one APUs is a high-pressure water pump suitable for use in fighting fires powered as an APU and is carried as part of a rear payload unit of a configurable electric truck and provides flow rates up to 2000 gallons-per-minute (GPM) at pressures up to 250 PSI.

9. The zero-emission configurable electric truck of claim 2, wherein the high voltage DC bus is a 400-800V bus connected to the battery management system, the at least one DC-to-AC inverter that provides motive power to the at least one electric motive motors provides up to 100KW, and the at least one DC-to-AC inverter that provide auxiliary power to the at least one APU which provides between 15 kW-300 kW.

10. The zero-emission configurable electric truck of claim 1, wherein the electric motor powered by the DC-to-AC inverter and a mechanical motor that powers the at least one APU are mated with a shaft interface that includes a male/female spline.

11. The zero-emission configurable electric truck of claim 1, the at least one APU is configured to be located anywhere on the chassis and/or rear payload unit without a need to for the at least one APU to be mechanically in line with a power take off (PTO) shaft.

12. The zero-emission configurable electric truck of claim 1, wherein the at least two battery modules are positioned substantially within an intra-frame space defined between the pair of main frame rails and between at least a pair of cross members transversely interconnected to the pair of main frame rails.

13. A zero-emission configurable electric truck that uses high-voltage, battery-powered electrical energy for both motive power and auxiliary powered unit power, the zero-emission configurable electric truck being a medium/heavy duty class of truck having a chassis frame configured to interface with any of a set of multiple configurable rear payload modules and a gross vehicle weight rating above 10,000 lbs, the zero-emission configurable electric truck comprising:

a central frame having a pair of main frame rails configured to support at least two battery modules;

a front subframe configured to support a front axle assembly and a cab, the front subframe including a pair of upper frame members operably connected to the corresponding pair of the main frame rails; and a rear subframe configured to support at least one rear axle assembly and a rear payload module selected from one of the set of multiple configurable rear payload modules, the rear subframe including a pair of rear frame rails transversely connected by at least a pair of cross members and operably connected to the corresponding pair of main frame rails, wherein at least one of the front axle assembly and the rear axle assembly includes at least one electric motive motor powered by a battery management system configured to manage generation and distribution of alternating-current (AC) electrical power from the at least two battery modules to the at least one electric motive motor to provide motive power to the zero-emission configurable electric truck and to at least one auxiliary power unit (APU) to provide auxiliary power to the rear payload module, wherein the at least one APU includes an AC electric motor with windings designed that produce a peak power to match an optimized power supplied by the DC-to-AC inverter to optimize a speed and torque for the AC electric motor for an electrical power requirement for a payload powered by the at least one APU.

14. The zero-emission configurable electric truck of claim 13, wherein the at least one AC electric motor further includes a gearing configuration to optimize an RPM interface between the at least one AC electric motors and a functional motor for the at least one APU.

15. The zero-emission configurable electric truck of claim 13, wherein the chassis frame includes a high voltage, direct current (DC) bus providing power from a battery pack via the battery management system to a plurality of DC-to-AC inverters, including at least one DC-to-AC inverter that is configured to provide AC electrical power to the at least one electric motive motor at a specific power output such that the motive motor runs at a first peak current for a desired torque of the at least one electric motive motor, and at least one at least one DC-to-AC inverter that is configured to provide AC electrical power to the at least one APU at a specific power output such that the at least one APU runs at a second peak current different than the first peak current.

16. The zero-emission configurable electric truck of claim 13, wherein the at least one AC electric motor is liquid cooled to improve a desired power density.

17. A zero-emission configurable electric truck that uses high-voltage, battery-powered electrical energy for both motive power and auxiliary powered unit power, the zero-emission configurable electric truck being a medium/heavy duty class of truck having a chassis frame configured to interface with any of a set of multiple configurable rear payload modules and a gross vehicle weight rating above 10,000 lbs, the zero-emission configurable electric truck comprising:

a central frame having a pair of main frame rails configured to support at least two battery modules;

a front subframe configured to support a front axle assembly and a cab, the front subframe including a pair of upper frame members operably connected to the corresponding pair of the main frame rails; and a rear subframe configured to support at least one rear axle assembly and a rear payload module selected from one of the set of multiple configurable rear payload modules, the rear subframe including a pair of rear frame rails transversely connected by at least a pair of cross members and operably connected to the corresponding pair of main frame rails, wherein at least one of the front axle assembly and the rear axle assembly includes at least one electric motive motor powered by a battery management system configured to manage generation and distribution of alternating-current (AC) electrical power from the at least two battery modules to the at least one electric motive motor to provide motive power to the zero-emission configurable electric truck and to at least one auxiliary power unit (APU) to provide auxiliary power to the rear payload module, wherein the electric motor powered by the DC-to-AC inverter and a mechanical motor that powers the at least one APU are mated with a shaft interface that includes a male/female spline.

18. The zero-emission configurable electric truck of claim 17, wherein the at least one APU includes multiple APUs in which each APU is configured to be carried by the zero-emission configurable electric truck and each APU is provided with its own DC-to-AC inverter to allow each APU to be optimized independent of any other APU power or motive power requirements.

19. The zero-emission configurable electric truck of claim 17, wherein the at least two battery modules are positioned substantially within an intra-frame space defined between the pair of main frame rails and between at least a pair of cross members transversely interconnected to the pair of main frame rails.

20. The zero-emission configurable electric truck of claim 17, the at least one APU is configured to be located anywhere on the chassis and/or rear payload unit without a need to for the at least one APU to be mechanically in line with a power take off (PTO) shaft.

\* \* \* \* \*